United States Patent [19]

Kauffman

[11] Patent Number: 5,298,189

[45] Date of Patent: Mar. 29, 1994

[54] PROTON TRANSFER BIS-BENZAZOLE FLUORS AND THEIR USE IN SCINTILLATOR DETECTORS

[75] Inventor: Joel M. Kauffman, Wayne, Pa.

[73] Assignee: Nanoptics Incorporated, Gainesville, Fla.

[21] Appl. No.: 873,166

[22] Filed: Apr. 24, 1992

[51] Int. Cl.$^5$ ............................................. C09K 11/06
[52] U.S. Cl. ........................ 252/301.17; 252/301.35; 252/301.27; 252/301.28; 548/219; 548/305.4
[58] Field of Search ...................... 252/301.17, 301.35, 252/310.27, 301.28; 548/219, 305.4

[56] References Cited

U.S. PATENT DOCUMENTS

| | | | |
|---|---|---|---|
| 2,737,516 | 3/1956 | Sartori . | |
| 3,010,908 | 11/1961 | Broderick et al. | 252/301.17 |
| 3,293,258 | 12/1966 | Slegrist et al. . | |
| 3,314,894 | 4/1967 | Nyilas et al. . | |
| 3,457,180 | 7/1969 | Kretz et al. | 252/301.17 |
| 3,575,996 | 4/1971 | Liechti et al. . | |
| 3,673,202 | 6/1972 | Orlando et al. . | |
| 4,127,499 | 11/1978 | Chen et al. | 252/301.35 |
| 4,594,179 | 6/1986 | Harrah et al. | 252/301.17 |
| 4,807,237 | 2/1989 | Ernsting | 372/25 |

OTHER PUBLICATIONS

Kasha et al., Proceedings of the Workshop on Radiation Hardness of Plastic Scintillator, Mar. 19–21, Tallahassee, Fla., pp. 49–60, (1990).
Chem. Communications (1971) 1551–1552; Orlando et al.: Red-and-Near-infrared-luminescent Benzazole Derivatives.
Chem. Phys. Letters (1984) vol. 111; No. 4, 5; 383–388; Mordzinski et al. Mechanism Of Excited-State Proton Transfer In "Double" Benzoxazole: Bis-2,5(-2-Benzoxazolyl)Hydroquinone.
J. Phys. Chem. (1986) vol. 90; 145514 1458; Mordzinski Kinetics of Excited-State Proton Transfer In Double Benzoxazoles: 2,5-Bis(2-Benzoxazolyl)-4-Methoxy Phenol.
J. Phys. Chem. (1986) vol. 90; 5503–5506; Mordzinski et al. Excited-State Proton-Transfer Reactions in 2-(2'-Hydroxyphenyl)benzoxazole, Role of Triplet States.
Proceedings of the Workshop on Radiation Hardness of Plastic Scintillators (1990) F. S. V., Flordia; 1–14; Zorn Designing A Radiation-Hard Plastic Scintillator For High Luminosity Hadron Colliders.
Proceedings of the Workshop on Radiation Hardness of Plastic Scintillators (199) F. S. V., Flordia; 15–28; Clough et al. Radiation Effects On Scintillating Fiber Optics For SSC.
Proceedings of the Workshop on Radiation Hardness of Plastic Scintillators (1990) F. S. V., Flordia; 49–60; Kasha et al., Molecular Electronic Criteria for Selection of Radiation-Hard Scintillators.

*Primary Examiner*—Prince Willis, Jr.
*Assistant Examiner*—Alan D. Diamond
*Attorney, Agent, or Firm*—William P. Hauser; Peter J. Georges

[57] ABSTRACT

A novel class of proton transfer, bis-benzazole, fluorescent compounds, i.e., fluors, is disclosed. The novel fluors include substituted or unsubstituted 1,4-bis(2-benzazolyl)-2-hydroxybenzenes and 1,4-bis(2-benzazolyl)-2-amidobenzenes wherein the benzazolyl group may be benzoxazolyl, benzimidazolyl, benzothiazolyl, and the like. The benzazolyl groups may be substituted with one or more alkyl groups to improve solubility in organic matrix materials such as solvents, monomers, resins, polymers, and the like. The novel fluors may be used in the manufacture of fluorescent coatings, objects, scintillators, light sources and the like. The novel fluors are particularly useful for radiation-hard, solid scintillators for the detection and measurement of high energy particles and radiation.

26 Claims, No Drawings

PROTON TRANSFER BIS-BENZAZOLE FLUORS AND THEIR USE IN SCINTILLATOR DETECTORS

Research leading to completion of the invention was supported by Grant No. DE-FG05-90ER80954 issued by the Department of Energy. The United States Government has certain rights to the invention described herein.

BACKGROUND OF THE INVENTION

1. Field of the Invention

This invention relates to large Stokes shift fluorescent materials which fluoresce in the visible radiation spectrum. More particularly, this invention relates to improved organic scintillator systems useful for detecting high energy particles and electromagnetic radiation.

2. Description of Related Art

Bis-benzazoles connected through a central phenylene group have been used as fluorescent whitening or brightening agents, for instance as disclosed in U.S. Pat. Nos. 2,737,516; 3,293,258 and 3,575,996. In particular, bis-benzoxazoles are disclosed containing a central phenylene group which may be substituted with lower alkyl groups or halogen atoms.

U.S. Pat. No. 3,314,894 discloses the use of bis-benzoxazolyl compounds in scintillators. This patent discloses that the compound must be free of ionizable or dissociable units, such as —OH groups or the —NH groups of imidazole compounds.

Bis-benzazolyl hydroquinones and their alkoxy, alkylcarbonyl, lower alkyloxycarbonyl, benzoyl and phenoxycarbonyl derivatives are disclosed in Orlando et al., U.S. Pat. No. 3,673,202 in which it is disclosed that the compounds fluoresce in the visible and near-infrared regions of the spectrum when exposed to ultraviolet light. The compounds are photochemically and thermally stable and can be dissolved in organic solvents. Referring to the hydrogen substitution on the hydroquinone moiety, i.e., "R", Orlando et al. indicate that when the R substituents are other than hydrogen, they increase the solubility of the compounds in organic solvents. The compounds can be incorporated in various polymers which can be used to produce films, molded objects, or applied as coatings on ultraviolet lamps to produce various colored lights when energized. In a publication (Chemical Communications, 1971, Pages 1551–1552) entitled "Red-and Near-infrared-luminescent Benzazole Derivatives", Orlando et al. compare the luminescent properties of 2-(2-hydroxyphenyl)benzazoles to those of bis-2,5-(2-benzazolyl)hydroquinones and their methyl ether derivatives wherein the benzxazole moiety is benzthiazole, benzoxazole, and benzimidazole. The ultraviolet spectra of the bis-benzazolehydroquinones in dimethylformamide was reported to have intense absorption from 320 to 410 nm (epsilon 26,000 to 43,000). From luminescence determined in the solid state, they observed that ultraviolet stimulated luminescence of the bis unsubstituted compounds was in the red and near infrared, and when substituted with methyl a hypsochromic shift of the emission band occurred. In comparison, they noted that the unsubstituted hydroxyphenylbenzazoles emitted in the blue end of the visible region and that the replacement of the o-hydroxy group by an o-methoxy group renders these benzazoles non- luminescent. In neither reference did Orlando et al. report or suggest that the bis-2,5-(2-benzazolyl)hydroquinones are soluble in styrene, vinyltoluene, xylene, or other such high efficiency scintillator solvents.

Mordzinski et al. have investigated excited-state proton-transfer reactions in 2-(2'-hydroxyphenyl)benzoxazole (J.Phys.Chem., 1986, 90, 5503–5506), in 2,5-bis(2-benzoxazolyl)hydroquinone (Chemical Physics Letters 1984, 111, No. 4,5; 383–388), and 2,5-bis(2-benzoxazolyl)-4-methoxyphenol (J.Phys.Chem. 1986, 90, 1455–1458). In the latter study, Mordzinski et al. indicates that 2,5-bis(2-benzoxazolyl)hydroquinone dissolved in 2-methyl tetrahydrofurane has an extinction coefficient of about 20,000 at about 24,000 cm$^{-1}$ (417 nm) and that 2,5-bis(2-benzoxazolyl)-4-methoxyphenol has an extinction coefficient of about 25,000 at about 27,000 cm$^{-1}$ (370 nm). Also in the latter study, Mordzinski et al. reported that 2,5-bis(2-benzoxazolyl)-4-methoxyphenol exhibits dual luminescence arising from primarily excited and proton-transferred species and that from temperature studies of relative fluorescent quantum yields (from 300° to 12° K.), they concluded that excited-state intramolecular proton transfer (hereinafter identified as ESIPT) was found to occur effectively at 77° K.

A number of plastic scintillators have been developed for the detection of high energy particles and radiation. Such plastic scintillators typically are comprised of a polymeric matrix, e.g., poly(vinyltoluene) (PVT) and a fluor (fluorescent compound), e.g., 3-hydroxy flavone (3-HF). Portions of such scintillators are expected to withstand radiation levels in excess of $10^4$ to $10^5$ Gy/yr without degradation of scintillator performance. Standard commercial plastic scintillators are known to suffer significant changes in performance at such radiation levels, typically due to formation of yellow to brown coloration in the matrix which absorbs substantial luminescence in the blue to UV spectral region. Attempts to restore the performance of radiation discolored plastic scintillators by treatments, such as by annealing or with oxygen, have only met with limited success. The issue of "radiation hardness" of plastic scintillators was the subject of a workshop on Mar. 19–21, 1990. (See *Proceedings of the Workshop on Radiation Hardness of Plastic Scintillator*, Mar. 19–20, 1990; Florida State University, Tallahassee, Fla.; Editor, Kurtis F. Johnson.) In these Proceedings, Clough et al., Pages 15–28, discusses radiation effects on scintillating fiber optics for the Superconducting Super Collider (SSC); Zorn, Pages 1–14 discusses the design of a radiation-hard plastic scintillator for high luminosity HADRON colliders; and Kasha et al., Pages 49–60, discusses the molecular electronic criteria for the selection of radiation-hard scintillators each of which is included herein by reference. U.S. Pat. No. 4,594,179 discloses a method of reducing reabsorption effects in scintillators by using solutes with large Stokes shifts, i.e., a large shift towards the red in the emitted luminescence from the region of the absorbed radiation. 3-hydroxy flavone (3-HF) is proposed as such a solute in a scintillator matrix such as poly(vinyltoluene) (PVT).

Although advances have been made to produce a radiation hard scintillator, there still exists a need to produce radiation hard fluors which are characterized by: a very high extinction coefficient in the near ultraviolet; a Stokes shifted fluorescence emission which is free of phosphorescence emission and is spectrally matched to the sensitivity of photodetection systems used; a high fluorescence efficiency at room temperature; a short fluorescence lifetime to provide fast system response times; and substantially no self-absorption of the emitted fluorescence by the fluor. Moreover, there still exists a need for a fluor that is soluble in the polymeric matrix as well as the monomer precursors thereto; is substantially stable during addition polymerization of the polymeric matrix and during prolonged exposure to high energy radiation; and is photochemically stable and resistant to ambient oxidation.

SUMMARY OF THE INVENTION

A high efficiency radiation hard scintillator is achieved by use of the scintillator composition of this invention which is a fluorescent composition comprising a matrix material which is transparent in at least a portion of the visible electromagnetic radiation spectrum and an organic, fluorescent compound dispersed in the matrix material, the organic, fluorescent compound being a 1,4-bis(2-benzazolyl)-benzene having the structure:

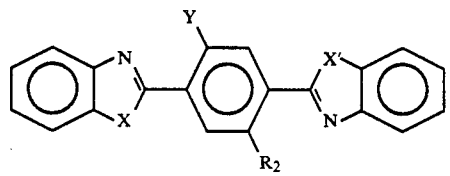

Formula I wherein X and X' each individually is a $N(R_3)$— group, —O—, or —S—; Y is a proton donating group; $R_2$ is a H or a $C_1$ to $C_{10}$ alkyl group; $R_3$ is a H or a $C_1$ to $C_{10}$ alkyl group and each benzazolyl is substituted or unsubstituted. In a preferred embodiment of this invention, the proton transfer group Y is a hydroxy group or an amido group. In another embodiment of this invention, each benzazolyl is substituted with one to four $R_1$ group(s), wherein each $R_1$ individually is a $C_1$ to $C_{10}$ alkyl group or aryl group. In a particularly preferred embodiment of this invention, when X and X' is —O— or —S—, the proton transfer group Y is a hydroxy group or a sulfonamido group of the structure: —NH—SO$_2$—R$_4$ wherein R$_4$ is a $C_1$ to $C_{10}$ alkyl group or aryl group; and when X and X' are $N(R_3)$— groups, the proton transfer group Y is a sulfonamido group of the structure: —NH—SO$_2$—R$_4$.

DETAILED DESCRIPTION OF THE INVENTION

The fluorescence and polymerizable compositions of this invention comprise a matrix material, such as a solvent, a liquid monomer, a transparent solid polymer, and the like, having dispersed therein a specific class of proton transfer bis-benzazole fluors, i.e., organic fluorescent compounds. This new class of bis-benzazole fluors possesses unusually high extinction coefficients in the near ultraviolet spectral region, i.e., about 40,000 or greater at about 420 nm or shorter and preferably 50,000 or greater between 300 and 420 nm, and unusually high fluorescence efficiency at room temperature in the visible spectral region of about 480 nm or longer, i.e., a fluorescence quantum yield of about 0.3 or greater and preferably 0.5 and greater along with a fast response time, i.e., a fluorescence lifetime of 5 nanoseconds or less and preferably 2 nanoseconds or less. The fluors of this invention are substantially free of reabsorption of the Stokes shifted fluorescence and the fluorescence emission spectra overlaps the most transparent portion of the matrix materials as well as the highly sensitive regions of conventional photodetectors, i.e., between about 480 and 600 nm. Thus, solutions of the fluors of this invention are substantially clear and colorless unless stimulated by near ultraviolet radiation to produce the visible, e.g., blue-green, fluorescence. The fluors are readily dispersible in organic solvents, liquid monomers, and polymeric matrix materials, and are substantially stable during polymerization of the monomer to a polymeric matrix as well as during their use in scintillation detectors for detection of high energy particle beams and high energy radiation.

The novel, proton-transfer, bis-benzazole fluors of this invention have the structure defined by Formula I defined supra. In a preferred embodiment of this invention the organic, fluorescent compound is a 1,4-bis(2-benzazolyl)-benzene having the structure:

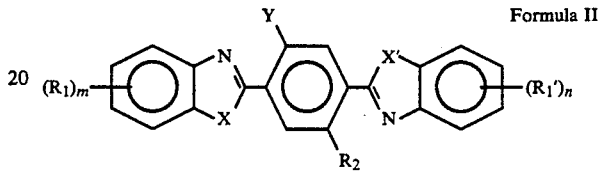

Formula II wherein X and X' each individually is a $N(R_3)$— group, —O—, or —S—; Y is a proton donating group, with the proviso that when X and X' each individually is a $N(R_3)$— group, then Y is an amido group; $R_1$ and $R_1'$ each individually is a $C_1$ to $C_{10}$ alkyl group or aryl group; m and n each individually is 0 or an integer 1, 2, 3, or 4; $R_2$ is a H or a $C_1$ to $C_{10}$ alkyl group; and $R_3$ is a H or a $C_1$ to $C_{10}$ alkyl group. In a particularly preferred embodiment of this invention, X and X' each individually is a $N(R_3)$— group, —O—, or —S—; Y is a hydroxy group or a sulfonamido group of the structure —NH—SO$_2$—R$_4$ wherein R$_4$ is a $C_1$ to $C_{10}$ alkyl group or aryl group, with the proviso that when X and X' each individually is a $N(R_3)$— group, then the amido group ,Y, is a sulfonamido group of the structure —NH—SO$_2$—R$_4$; and $R_1$ and $R_1'$ each individually is a $C_1$ to $C_6$ alkyl group or a phenyl group; m and n each individually is 0, 1, or 2; $R_2$ is a H or a $C_1$ to $C_6$ alkyl group; and $R_3$ is a H or a $C_1$ to $C_6$ alkyl group. Preferably, $R_1$ and $R_1'$ each individually is a methyl, ethyl, propyl, butyl, or phenyl group; $R_2$ and $R_3$ each individually is a H or a methyl, ethyl, propyl, or butyl group; and R$_4$ is a methyl, ethyl, propyl, butyl, benzyl or toluyl group. Also useful are substituted benzazolyl groups wherein $R_1$ and $R_1'$ each individually is a perfluorinated $C_1$ to $C_{10}$ alkyl group, e.g. such as trifluoromethyl, or other such equivalent electron withdrawing group. Typically the bis-benzazoles of this invention are symmetrical, i.e., X is the same as X' and m is the same as n which typically is 0, 1, or 2.

Preferred bis-benzazole fluors include the novel 1,4-bis(2-benzoxazolyl)-2-hydroxybenzene which may be substituted with one or more methyl, ethyl, propyl, butyl or phenyl group(s). Particularly preferred of this class are 1,4-bis(2-benzoxazolyl)-2-hydroxybenzene; 1,4-bis(5-phenyl-2-benzoxazolyl)-2-hydroxybenzene; 1,4-bis(5-ethyl-2-benzoxazolyl)-2-hydroxybenzene; 1,4-bis(5-t-butyl-2-benzoxazolyl)-2-hydroxybenzene; and 1,4-bis(5,7-dimethyl-2-benzoxazolyl)-2-hydroxybenzene. Also preferred are bis-benzazole fluors which include the novel 1,4-bis(2-benzoxazolyl)-2-(sulfonamido)benzenes which may be substituted with one or more methyl, ethyl, propyl, butyl or phenyl group(s).

Particularly preferred of this class are 1,4-bis(2-benzoxazolyl)-2-(methanesulfonamido)benzene; 1,4-bis(5-ethyl-2-benzoxazolyl)-2-(methanesulfonamido)benzene; and 1,4-bis(2-benzoxazolyl)-2-(tolsylamino)benzene. Equally preferred bis-benzazole fluors include the novel 1,4-bis(2-benzimidazolyl)-2-(sulfonamido)benzenes which may be substituted with one or more methyl, ethyl, propyl, butyl or phenyl group(s). Particularly preferred of this class is 1,4-bis(1-methyl-2-benzimidazolyl)-2-(methanesulfonamido)benzene. Also useful are bis-benzazole fluors which include the 1,4-bis(2-benzthiazolyl)-2-hydroxybenzenes and 1,4-bis(2-benzthiazolyl)-2-(sulfonamido)benzenes which may be substituted with one or more methyl, ethyl, propyl, butyl or phenyl group(s).

It has been found that the acidity of the proton transfer group influences the efficiency of proton transfer fluorescence of the bis-benzazole fluors of this invention. Typically, the group Y is a proton transfer group having a $pK_a$ between about 5 and about 15, with the proviso that when X and X′ each individually is a $N(R_3)$— group, then Y is an amido group and preferably a sulfonamido group. Such proton transfer groups include hydroxy, sulfonamido, carbonamido, and the like.

Solutions of the proton-transfer, bis-benzazole fluors of this invention, absorb strongly in the ultraviolet to blue spectral region, i.e., about 420 nm or shorter (preferably between 300 and 420 nm), with absorption maxima in the ultraviolet indicating an extinction coefficient of about 40,000 or greater is typical for these fluors. These bis-benzazole fluors likewise possess unusually strong, ultraviolet-stimulated, proton-transfer fluorescence in the visible spectral region, having a fluorescence emission peak of about 480 nm or longer at room temperature or higher, and preferably between 480 nm and 560 nm, (strong fluorescence has been observed at temperatures of 400° K. and above) indicating that a fluorescence quantum yield of about 0.3 or greater, preferably 0.5 or greater at 300° K. can be achieved. When the compositions of this invention are used as a scintillator, high light output, i.e., high scintillator efficiency, translates to a fluor with both a good ability to absorb light (high extinction coefficient, $\epsilon$) and high fluorescence quantum yield, $\Phi$. The fluorescence lifetimes of the fluors used in the compositions of this invention have a fluorescence life time of about 5 nanoseconds or less and preferably 2 nanoseconds or less, which insures a fast response time (i.e., scintillation decay time) when used in a scintillator system with minimum dead time during which the fluor is present in its excited state. Such fast response times of 5 nanoseconds or less are correlated to the fluors' high extinction coefficients of 40,000 or greater in the near ultraviolet spectral region. Furthermore, there appears to be substantially no self absorption of the stimulated visible fluorescence by these benzazole fluors. In addition the matrix material typically is substantially transparent in this portion of the visible spectral region. Accordingly, an organic fluorescent compound of this invention is substantially transparent to its own fluorescent emission within the visible spectral region which enhances its use as a radiation hard scintillator material. The extinction coefficient(s), fluorescence quantum yield and fluorescent life time of a particular fluor may be determined by conventional means, e.g., such as disclosed in Harrah et al., U.S. Pat. No. 4,594,179 which is incorporated herein by reference. The particular means used to determine extinction coefficients, fluorescence efficiencies and quantum yields in this invention are illustrated in the examples to follow.

The bis-benzazolyl compounds of this invention typically may be prepared by conventional organic synthesis methods, although in specific instances unique procedures may be devised. In general, the bis-benzazolyl-hydroxybenzene compounds of this invention may be prepared using synthesis procedures disclosed by Mordzinski et al. in Chemical Physics Letters 1984, 111, No. 4,5; 383–388, and by Orlando et al. U.S. Pat. No. 3,673,202, each of which is included herein by reference. Preferred synthesis methods are illustrated in the examples that follow.

The matrix material in which the proton-transfer, bis-benzazole fluors are dispersed may be any vehicle suited to the particular application for the fluorescent composition of this invention. Typically, the matrix material is an organic solvent for the fluor, a polymerizable monomer, a polymeric material, or any combination thereof, e.g., such as polymerizable coating solution of the fluor. For efficient use with the fluor of this invention, the matrix material should be transparent in at least a portion of the visible electromagnetic spectrum and preferably in the visible spectral region of about 480 nm or longer. The matrix material should be capable of completely dispersing the fluors of this invention to produce an optically clear fluorescent composition substantially free of macro size particles which would scatter incident radiation. Preferably, the fluor is completely dissolved in the matrix material to form a homogeneous solution.

The matrix material may be chosen from any conventional organic solvent for bis-benzazole type compounds. Illustrative of such solvents are toluene, xylene, phenylcyclohexane, p-dioxane, alkanols, glycols, alkoxyalkanols, phenoxyalkanols, N,N-dimethylacetamide and the like, of which xylene, toluene and lower alkanols are preferred. An unusual feature of the fluors of this invention is that ESIPT fluorescence is not substantially affected by the use of alkanols and even small amounts of water as contrasted to such conventional fluors. Accordingly, although organic solvents typically are used as matrix materials, semiaqueous solvents may also be used provided they do not adversely affect fluorescence efficiency of the dispersed fluor. Illustrative of useful semiaqueous solvents are mixtures of water with miscible alkanols, glycols, alkoxyalkanols, phenoxyalkanols and the like.

The matrix material may be a solid polymeric material formed by free radical or condensation polymerization. Illustrative of such polymeric materials are vinyl, styryl, acrylic, and diene polymers and copolymers thereof, and polyesters, polyamides, polyimides and the like. Preferred polymeric matrix materials are styrene and vinyltoluene. It is a characteristic of the bis-benzazole fluors of this invention that they possess excellent solubility in polymeric matrices providing intense visible fluorescence to the polymer composition. Preferably the fluor should possess adequate solubility in polystyrene or other organic polymers so that the fluor may be used in a scintillator as a primary fluor or as a "waveshifter" secondary fluor. When used as a primary fluor, i.e., without a secondary fluor, the concentration in the polymeric matrix should be about $10^{-2}M$ or greater, and when used as a "waveshifter" the concentration should be about $10^{-4}M$ or greater.

The bis-benzazole fluors of this invention may be dispersed in the polymeric matrix by any conventional method depending on the end use of the resulting fluorescent composition formed. Thus, the fluor and the polymer may be dissolved in a cosolvent therefor and applied to a substrate and dried to form an adherent polymeric coating. The fluor may also be blended in melted polymer and then extruded or cast into any desired shape, e.g., into a film, a rod, a disc, and the like. The fluor may also be dissolved in the monomeric prepolymer composition which is then polymerized to form a solid polymer solution of the bis-benzazole fluor.

An embodiment of the present invention is a polymerizable composition comprising (A) one or more polymerizable component(s) and (B) a bis-benzazole having the structure of Formula I. In a preferred embodiment the polymerizable component(s) is a free radical, addition polymerizable monomer having one or more terminal, ethylenically unsaturated groups. Particularly preferred free radical, addition polymerizable monomers are taken from the group consisting of styrene, vinyltoluene, $C_2$ to $C_{20}$ alkyl styrene, divinylbenzene, methyl methacrylate and mixtures thereof. The bis-benzazole fluors of this invention have the advantage that they are soluble in both the polymerizable components as well as the polymerized matrix in highly effective amounts. In addition, the bis-benzazole fluors of this invention are substantially unaffected by the polymerization process (in contrast to conventional fluors, such as 3-HF, which exhibit thermal instability at the high temperatures used for the thermal polymerization process). The actual concentration in a polymerizable composition will depend on the particular fluor used, as well as the particular utility of the resulting fluorescent, polymerized composition. Illustrative of concentration differences is the use of a particular fluor in a plastic scintillator either as a primary fluor in which case the concentration may be 1% by weight or more, or as a secondary fluor in which case the concentration may be 0.1% or less.

The fluorescent compositions of this invention are particularly useful for radiation-hard, plastic scintillator devices which are used to detect high energy particles and photons. For the purpose of this invention, the term "radiation-hard" is intended to mean that the detection efficiency of the scintillator device, or its components, has a substantially stable high detection efficiency over a prolonged period of irradiation by high energy particles or photons, e.g., the detection efficiency changes by no more than 20% during an exposure to high energy radiation of $10^5$ Gy/yr or to 10 megarads of $^{60}Co$ γ-rays. For the purpose of this invention, rad-hardness is intended to mean that there is minimal drop in scintillator light output when it is subjected to 10 megarads or more of $^{60}Co$ γ-rays. Methods of making and using conventional scintillators are disclosed in Harrah et al., supra, as well as the patents and publications cited therein, and include considerations such as conventional selection of primary matrix constituents, compounds for use as the various solutes, the number of solutes to be employed, the concentrations of various solutes, the fabrication of the scintillators themselves, their use in various conventional optical/radiometric systems, etc. Likewise, considerations of scintillator performance and optimization are disclosed in *Proceedings of the Workshop on Radiation Hardness of Plastic Scintillator*, Mar. 19–20, 1990; Florida State University, Tallahassee, Fla.; Editor, Kurtis F. Johnson, wherein the treatment of radiation deteriorated plastic scintillators by annealing or with oxygen is discussed to help restore original performance. The radiation-hard fluors of this invention may be used with these conventional practices to produce radiation-hard scintillators with improved detection efficiency. Most notably, the polymerizable compositions of this invention discussed supra are particularly useful in forming radiation-hard scintillators by methods such as described in Harrah et al. and the "*Proceedings*", supra.

The radiation hard plastic scintillators of this invention comprises a polymeric matrix material, preferably an aromatic polymeric material, and at least one fluorescent bis-benzazole compound having the structure of Formula I, defined supra.

The polymeric matrix material typically is one or more aromatic polymer(s), such as polystyrene, polyvinyltoluene, and the like, or is a copolymer of styrene and/or vinyl-toluene with $C_2$ to $C_{20}$ alkyl styrene, divinylbenzene, and the like. Alternatively, the polymeric matrix material may be an acrylic polymer having dissolved therein an aromatic compound, e.g., such as poly(methyl methacrylate) containing 5 to 25% by weight of naphthalene dissolved therein. When the plastic scintillator is used in the form of a fiber, it must possess sufficient flexibility to be bent around sharp radius turns and it should have a sufficiently low glass transition temperature so that any stress in the fiber may be removed by annealing. Typically, such polymeric materials should possess a glass transition temperature ($T_g$) of about 70° C. or lower, and preferably between about 40° C. and 70° C. Low $T_g$ siloxane elastomers may also be used. Flexibility may be imparted to the polymeric material by conventional methods provided that scintillator characteristics are not adversely affected. Such methods include the use of plasticizers, copolymer components substituted with a long alkyl chain, e.g., decylstyrene, or combinations thereof.

In addition to the properties described supra, the bis-benzazoles of this invention are substantially photochemically stable, are stable to ambient oxidation and are substantially radiation hard particularly when used in the plastic scintillators of this invention. The term "photochemically stable" is intended to mean that the bis-benzazole fluors of this invention do not decompose or interact with other fluors or matrix materials as a result of exposure to ultraviolet radiation of the type and levels characteristic of use in a plastic scintillator detector. The term "stable to ambient oxidation" is intended to mean that the bis-benzazole fluors of this invention do not oxidize in the presence of ambient oxygen or other oxidants at levels characteristics of use in a plastic scintillator detector or its treatment. The term "radiation hard fluor" is intended to mean that the fluorescence of a bis-benzazole fluor of this invention is substantially unchanged during an exposure to high energy radiation of $10^5$ Gy/yr, so that the detection efficiency of a polystyrene scintillator containing only the bis-benzazole fluor changes by no more than 20%. The radiation hard plastic scintillators of this invention may be made by dissolving the bis-benzazole fluor of Formula I in liquid monomer or prepolymer composition, e.g., styrene, vinyltoluene; casting the fluor/monomer solution into a mold of desired shape; and then polymerizing the monomer to form a polymer solution of the fluor. After polymerization the molded polymer solution may be further shaped, polished or otherwise treated to form the plastic scintillator of this invention.

Methods of making and testing the plastic scintillators of this invention will be further illustrated in the examples that follow.

In addition to their use in radiation hard scintillators described supra, the bis-benzazole fluors of Formula I may be used in a variety of other applications. They may be incorporated in various polymers to impart their fluorescent properties to polymers which can be used to produce films, molded objects, or applied as coatings on the envelopes of ultraviolet lamps to produce colored lights when energized, such as generally disclosed in Orlando et al., U.S. Pat. No. 3,673,202 which is incorporated herein by reference. They may be incorporated along with a tritiated material into a polymeric matrix to form a solid-state, radio-luminescent composition such as disclosed in Clough et al., U.S. Pat. No. 4,997,597 which is incorporated herein by reference. They may also be dissolved in an appropriate matrix, e.g., solvent, to form the lasing component of a dye laser such as disclosed in Kleinerman, U.S. Pat. No. 4,287,481; Fletcher, U.S. Pat. No. 4,603,422; and Kauffman et al., U.S. Pat. No. 5,037,578 each of which is incorporated herein by reference.

The bis-benzazole compositions of this invention will now be illustrated by the following examples but is not intended to be limited thereby.

Example 1

The fluor 1,4-bis(2-benzoxazolyl)-2-hydroxybenzene hereinafter identified as Compound A was prepared as follows. A powdered mixture of 4.36 g (0.04 moles) of 2-aminophenol and 3.64 g (0.02 moles) of 2-hydroxyterephthalic acid was added to 150 ml of polyphosphoric acid previously heated to below 100° C. The reaction mixture was stirred and heated to 200° C. and the stirred reaction mixture was held at 200° C. for 24 hours. The resulting solution was allowed to cool to 100° C. and then quenched in 450 g of ice. The pH of the resulting mixture was adjusted to 6 with 50% aqueous sodium hydroxide solution and ice and the resulting precipitate isolated by conventional means (filtering and/or centrifuging). The precipitate was dried and was determined to have a melting point of 317° C. A sample of the precipitate was then sublimed at 760 torr and at a temperature above 380° C. without decomposition. The precipitate was sublimed at 285° C. and 0.05 torr to give 4.89 g of a pink solid which was then recrystallized from 200 ml of N,N-dimethylacetamide. The resulting filtrate was washed with N,N-dimethylacetamide and with ethanol and then dried at 90° C. and 20 torr for 16 hours to yield 4.40 g salmon colored needles having a melting point 325°–326° C. and was soluble in xylene at 25° C. as a 0.01 molar solution.

Analysis for Compound A, $C_{20}H_{12}N_2O_3$, with MW of 328.33; Calculated: C, 73.16; H, 3.68; N, 8.53%. Found: C, 72.62; H, 3.66; N, 8.80%.

The ultraviolet absorption spectrum of Compound A as a $4 \times 10^{-5}M$ chloroform solution was determined with a Shimadzu UV 265 Spectrophotometer. Absorption maxima ($\lambda$ Max) and their respective extinction coefficients ($\epsilon$) for Compound A are as follows:

| $\lambda$ Max (nm) | $\epsilon$ |
| --- | --- |
| 372 | 47,000 |
| 353 | 52,000 |
| 327 | 41,000 |
| 315 | 32,000 |

A toluene solution of the sublimate gave a bright green fluorescence when illuminated with short or long wavelength ultraviolet light. The fluorescence of the solution appeared similar to but brighter than the fluorescence of a similar toluene solution of 3-hydroxyflavone (3-HF) which is a conventional scintillator fluor. Using the same chloroform solution used in the absorption measurements supra, the emission spectra was determined for Compound A using a Perkin-Elmer LS-5B Spectrophotometer. Compound A had an uncorrected emission maxima (Em $\lambda$ Max) of 495 nm with a median emission at 506 nm.

Example 2

The fluor 1,4-bis(5-phenyl-2-benzoxazolyl)-2-hydroxybenzene hereinafter identified as Compound B was prepared by the process substantially as described in Example 1. A powdered mixture of 2.96 g (0.016 moles) of 4-phenyl-2-aminophenol and 1.46 g (0.008 moles) of 2-hydroxyterephthalic acid was added to 50 ml of polyphosphoric acid previously heated to below 120° C. The reaction mixture was stirred and heated to 200° C. and the stirred reaction mixture was held at 200° C. for 23 hours. The resulting solution was then quenched in 200 g each of ice and water; the pH of the resulting mixture was adjusted to 3 with 50% aqueous sodium hydroxide solution and the resulting precipitate isolated by filtering. The precipitate was washed with 50% methanol solution vacuum dried (at 70° C./30 torr) to give 4.95 g black solid having a melting point of about 295° C. The solid was extracted in a small Soxhlet apparatus with 150 ml benzene for 1 week. The solution was cooled and the precipitate filtered and vacuum dried (at 100° C./15 torr) to give 0.93 g of a black solid with a melting point of 305°–311° C. (A toluene solution of the black solid at 100° C. surprisingly gave as bright a green fluorescence as that of the same solution at 18° C. when illuminated with long wavelength ultraviolet light.) The solid was then recrystallized from 70 ml of N,N-dimethylacetamide and the resulting filtrate was washed with 10 ml N,N-dimethylacetamide and then recrystallized a second time from 45 ml of N,N-dimethylacetamide and the resulting filtrate was washed with acetone and vacuum dried (at 70° C. and 15 torr) for 3 days to yield 0.76 g of a pale yellow powder having melting points of 305° C., 314°–315° C. the solid was further recrystallized from 80 ml of p-xylene and the filtrate room temperature dried to yield 0.46 g yellow powder having a melting point 311°–317° C.

Analysis for Compound B, $C_{32}H_{20}N_2O_3$, with a MW of 480: Calculated: C, 79.99; H, 4.20; N, 5,83%. Found: C, 79.71; H, 4.23; N, 5.70%.

The ultraviolet absorption spectrum of Compound B as a $4.91 \times 10^{-5}M$ chloroform solution was determined with the Shimadzu UV 265 Spectrophotometer described in Example 1. Absorption maxima ($\lambda$ Max) and their respective extinction coefficients ($\epsilon$) for Compound B are as follows:

| $\lambda$ Max (nm) | $\epsilon$ |
| --- | --- |
| 381 | 51,000 |
| 361 | 60,000 |

| | |
|---|---|
| 348 | 40,000 |

Using the same chloroform solution the emission spectra was determined for Compound B using the Perkin-Elmer LS-5B Spectrophotometer described in Example 1. Compound B had an uncorrected fluorescence emission maxima (Em λ Max) of 498 nm and a non-proton fluorescence emission 408 nm.

Example 3

The fluor 1,4-bis(5,7-dimethyl-2-benzoxazolyl)-2-hydroxybenzene hereinafter identified as Compound C was prepared by the process substantially as described in Example 1. A powdered mixture of 5.0 g (0.0364 moles) of 4,6-dimethyl-2-aminophenol and 3.32 g (0.0182 moles) of 2-hydroxyterephthalic acid was added to 125 ml of polyphosphoric acid previously heated to about 100° C. The reaction mixture was stirred and heated to 195° C. and the stirred reaction mixture was held at 195° C. for 22 hours. The resulting solution was then quenched in 250 g each of ice and water; the reaction flask rinsed with 95% ethanol and the mixture stirred for 2 days. The resulting precipitate was isolated by filtering and vacuum dried (at 70° C./10 torr) to give 7.48 g grey solid having a melting point of 270°–290° C. The grey solid was extracted in a small Soxhlet apparatus with 150 ml benzene. The resulting tan suspension was diluted with an equal volume of cyclohexane; was cooled to 0° C. for 2 hours; the precipitate filtered and washed with cyclohexane and then vacuum dried (at 60° C./20 torr) to give 4.27 g of a solid with melting points of 270° C.; 282°–298° C. The solid is very soluble in toluene and 0.1 g was soluble in 25 ml of 2-ethoxyethanol at the boiling point. The solid was recrystallized from 400 ml of 2-butoxyethanol and the resulting filtrate was washed with 2-propanol and then vacuum dried (at 85° C. and 15 torr) for 2 days to yield 3.36 g of an orange powder having a melting point 295°–302° C. the solid was further recrystallized from 400 ml of 2-butoxyethanol; then from 40 ml N,N-dimethylacetamide; and then from 90 ml p-xylene. The orange powder was extracted from a 4.0 cm high column of alumina (Br, I, neut., Aldrich 19,997-5) with 80 ml benzene in a small Ace-Kauffman column. The extract, a yellow suspension, was diluted with 150 ml of absolute ethanol and kept at 0° C. for 1 hour. The mixture was then filtered, washed with 95% ethanol, and then dried to yield 0.63 g yellow prisms having a melting point 303°–305° C.

The ultraviolet absorption spectrum of Compound C as a 2.9×10⁻⁵M chloroform solution was determined with the Shimadzu UV 265 Spectrophotometer described in Example 1. Absorption maxima (λ Max) and their respective extinction coefficients (ε) for Compound C are as follows:

| λ Max (nm) | ε |
|---|---|
| 378 | 50,000 |
| 359 | 57,000 |
| 331 | 32,000 |

Using the same chloroform solution the emission spectrum was determined for Compound C using the Perkin-Elmer LS-5B Spectrophotometer described in Example 1. Compound C had an uncorrected fluorescence emission maxima (Em λ Max) of 491 nm with a median at about 505 nm.

Example 4

The fluor 1,4-bis(5-ethyl-2-benzoxazolyl)-2-hydroxybenzene hereinafter identified as Compound D was prepared and purified by the process substantially as described in the previous Examples 1 to 3 using as the starting materials 4-ethyl-2-aminophenol and 2-hydroxyterephthalic acid.

The ultraviolet absorption spectrum of Compound D as a chloroform solution was determined with the Shimadzu UV 265 Spectrophotometer described in Example 1. Absorption maxima (λ Max) and their respective extinction coefficients (ε) for Compound D are as follows:

| λ Max (nm) | ε |
|---|---|
| 375 | 50,000 |
| 355 | 57,000 |
| 330 | 39,000 |

Example 5

The fluor 1,4-bis(5-t-butyl-2-benzoxazolyl)-2-hydroxybenzene hereinafter identified as Compound E was prepared using as the starting materials 2-hydroxyterephthalic acid, thionyl chloride, N-methylpyrrolidinone, and 4-t-butyl-2-aminophenol.

To a stirred reaction vessel was added 9.10 g (0.05 moles) of 2-hydroxyterephthalic acid and 100 ml of N-methylpyrrolidinone which had been dried over 4A molecular sieve. The reaction mixture was cooled to 10° C. and 8.76 ml (0.12 moles) of thionyl chloride was added over 30 minutes while maintaining the temperature at about 10° to 15° C. The reaction solution was then heated to and maintained at 25° C. for 15 minutes after which 18.18 g (0.11 moles) of 4-t-butyl-2-aminophenol is added and the reaction mixture heated to 145° C. and maintained at that temperature for 3 hours. The reaction mixture was cooled to about 50° C. and then quenched in a mixture of 17 g sodium acetate trihydrate, 150 ml water, and 50 g ice to produce an insoluble mass. The mass was heated with 100 ml of 2-ethoxyethanol and then kept at room temperature until a granular precipitate formed. The precipitate was filtered, washed with 10 ml of 2-ethoxyethanol and then with 20 ml isopropanol, and then vacuum dried at 70° C. and 15 torr for 16 hours to yield a tan solid having a melting point range of 252°–253° C. The tan solid was extracted from a 6 cm high column of alumina (Br, I, neut., Aldrich 19,997-5) with 200 ml cyclohexane in a small Ace-Kauffman column. The cyclohexane was distilled from the resulting solution until the volume was reduced to about 30 ml. 100 ml of absolute ethanol was then added to the solution which was then allowed to cool to room temperature and filtered. The precipitate was washed with absolute ethanol and then vacuum dried at 100° C. and 10 torr for 1 hours to yield 3.65 g of a pale yellow powder having a melting point range of 258°–259° C.

The ultraviolet absorption spectrum of Compound E as a chloroform solution was determined with the Shimadzu UV 265 Spectrophotometer described in Example 1. Absorption maxima (λ Max) and their respective extinction coefficients (ε) for Compound E are as follows:

| λ Max (nm) | ε |
|---|---|
| 377 | 50,000 |
| 357 | 58,000 |
| 331 | 37,000 |

Example 6

The fluorescence quantum yields, i.e., Φ, of the 1,4-bis(2-benzoxazolyl)-2-hydroxybenzenes of Compounds A through E are determined as follows and compared to the quantum yield of 1,4-bis(2-benzoxazolyl)-2-hydroxy-5-methoxybenzene, identified herein as Compound Z. (1,4-Bis(2-benzoxazolyl)-2-hydroxy-5-methoxybenzene was prepared substantially as in Examples 1 through 4, using as starting materials 2-aminophenol and 2-hydroxy-5-methoxyterephthalic acid.) Fluorescence quantum yields were determined by the dilute solution method as described by J. N. Demas and G. Crosby in J.Phys.Chem., 75, 991 (1971) using a Farrand Spectrofluorometer, Mk. I, which had been rebuilt by Optical Technologies, Inc., Elmsford, N.Y. to give corrected spectra. The quantum yield measurements were calibrated using as a reference OX 2, which is 1-methyl-4-[5(4-methoxyphenyl)-2-oxazolium]-pyridinium p-toluenesulfonate and which has a reported fluorescence quantum yield of 0.73 in ethanol/water solution (R. F. Kubin et al.; Laser Chemistry, 10, 247 (1990). All quantum yields were determined at room temperature, i.e., about 22° C. and except for OX 2, all quantum yields were determined as toluene solutions. The fluorescence quantum yield (Φ) of each compound of this invention, is given in Table 1 along with its primary absorption maximum (ABS) in the spectral region between 300 and 420 nm; its extinction coefficient (ε); and its fluorescence emission maximum (FLR). The substitution of the benzoxazolyl group at the 5 position (5-R) and the 7 position (7-R) are included for clarity and the Compounds of this invention are listed in the order of their solubility in polystyrene. The quantum yields for OX 2 and 1,4-Bis(2-benzoxazolyl)-2-hydroxy-5-methoxybenzene (i.e., Compound Z) are also included for comparison.

TABLE 1

| COMPOUND | 5-R | 7-R | ABS(nm) | ε | FLR(nm) | Φ |
|---|---|---|---|---|---|---|
| B | C$_6$H$_5$ | H | 363 | 60,000 | 498 | 0.39 |
| A | H | H | 355 | 52,000 | 495 | 0.48 |
| C | CH$_3$ | CH$_3$ | 360 | 57,000 | 491 | 0.34 |
| D | CH$_3$CH$_2$ | H | 359 | 58,000 | 492 | 0.39 |
| E | (CH$_3$)$_3$C | H | 358 | 58,000 | 492 | 0.41 |
| OX 2 | — | — | 400 | 20,000 | 567 | 0.73 |
| Z | H | H | 339 | 54,000 | 498 | 0.06 |

Compounds A through E all have an extinction coefficient above 50,000 and a fluorescence quantum yield well above 0.30, whereas Compound Z has a quantum yield which is 5 times or more lower. Although Compounds A and B have lower solubility, they may be effectively used as a secondary or "wave shifter" fluor, whereas Compounds D and E with high solubility may be used as a primary fluor.

Example 7

The fluor 1,4-bis(1-methyl-2-benzimidazolyl)-2-methylsulfonamidobenzene hereinafter identified as Compound F was prepared as follows.

First, 2-methylsulfonamidoterephthalic acid was prepared as follows. 19.4 g methanesulfonic anhydride was placed in a flask and heated to produce a liquid. 10.3 g dimethyl 2-aminoterephthalate was added to the liquid over a period of 2-3 minutes. The mixture was initially heated at 130° C. for 15 minutes and then at 100° C. for 2 hours and 30 minutes. The mixture was then cooled, 50 ml of cold water added, the mixture stirred for 1 hour and then filtered. The precipitate was recrystallized from 100 ml of methanol which yielded 10 g precipitate having a melting point of 120° C. To a flask were added 1 g of the precipitate, 40 ml of water and 0.6 g potassium hydroxide and the mixture stirred at room temperature. After 15 minutes the slurry became a solution and stirring continued for a total of 12 hours. The solution was then acidified to a pH of about 2 with 6 molar hydrochloric acid to produce a thick precipitate. The precipitate was filtered and dried to yield 0.4 g of a material having a melting point of 296°-298° C. The material was identified by NMR through its potassium salt to be 2-(methylsulfonamido)terephthalic acid.

A reaction mixture consisting of 0.5 g (0.0019 moles) 2-(methylsulfonamido)terephthalic acid, 10 ml thionyl chloride, and 4-5 drops of dimethylformamide as the catalyst, was heated at reflux for about 3 hours and then the thionyl chloride was removed from the mixture using a rotary evaporator to form a viscous liquid. To the viscous liquid was added 0.5 g (0.0041 moles) N-methyl-o-phenylenediamine dissolved in 12 ml dimethylformamide and then another 4 ml dimethylformamide. The mixture was heated under reflux for 14 hours; then cooled for about 4 hours and then filtered to yield about 20 mg of needles which were found to be very hygroscopic. The filtrate was diluted with about 17-18 ml water and chilled to produce additional hygroscopic precipitate which was isolated. The filtrate was warmed and passed through activated charcoal (about 200 mg) and was then extracted with 100 ml ether. The ether solution was dried with anhydrous magnesium sulfate and the ether removed from the filtrate to yield a yellow oil. 10 ml water was added to the yellow oil and the resulting turbid mixture was allowed to stand for 4 hours and then filtered to yield 15 mg of needles having a melting point of 221°-224° C. The isolated material was determined to be 1,4-bis(1-methyl-2-benzimidazolyl)-2-(methylsulfonamido)benzene by NmR analysis.

The ultraviolet absorption spectrum of Compound F in chloroform solution was determined as in Example 1 and indicated an absorption maximum (λ Max) at 330 nm and an extinction coefficients (ε) of 40,000.

Using the same chloroform solution the emission spectra was determined for Compound F using the procedure described in Example 1. Compound F had an uncorrected fluorescence emission maxima (Em λ Max) of 505 nm.

Example 8

The fluor 1,4-bis(1-methyl-5-ethyl-2-benzoxazolyl)-2-(methylsulfonamido)benzene hereinafter identified as Compound G was prepared using as the starting materials 2-(methylsulfonamido)terephthalic acid (prepared as described in Example 7), thionyl chloride, N-methylpyrrolidinone, and 4-ethyl-2-aminophenol.

To a stirred reaction vessel was added 13.04 g (0.05 moles) of 2-(methylsulfonamido)terephthalic acid and 100 ml of N-methylpyrrolidinone which had been dried over 4A molecular sieve. The reaction mixture was cooled to 10° C. and 8.76 ml (0.12 moles) of thionyl chloride was added over 30 minutes while maintaining the temperature at about 10° to 15° C. The reaction solution was then heated to and maintained at 25° C. for 15 minutes after which 15.07 g (0.11 moles) of 4-ethyl-2-aminophenol is added and the reaction mixture heated to 145° C. and maintained at that temperature for 3 hours. The reaction mixture was cooled to about 50° C. and held at that temperature overnight. The mixture was then quenched with aqueous sodium acetate solution until pH of 4 is reached to produce a precipitate. The precipitate was filtered, washed with water and then placed in a container with sodium carbonate and water until the pH of the mixture was 8. The precipitate was filtered, washed with water, ethanol and then methanol and then vacuum dried at 60° C. and 15 torr for 16 hours to yield a dark solid having a melting point of about 180° C. The solid was recrystallized twice from 2-ethoxyethanol and then was extracted from a 5 cm high column of silica ( Aldrich 24,217-9) with 60 ml cyclohexane in a small Ace-Kauffman column and then with benzene. The solvent was distilled from the resulting solution and a precipitate. The precipitate was extracted a second time using new silica and benzene. The solution was concentrated and methanol was then added to the solution which was then cooled and filtered. The precipitate was dried to yield 0.56 g of a pale yellow powder having a melting point range of 275°–278° C.

The ultraviolet absorption spectrum of Compound G as a chloroform solution was determined with the Shimadzu UV 265 Spectrophotometer described in Example 1. Absorption maxima (λ Max) and their respective extinction coefficients ($\epsilon$) for Compound G are as follows:

| λ Max (nm) | $\epsilon$ |
|---|---|
| 377 | 40,000 |
| 358 | 48,000 |
| 342 | 37,000 |

Using the same chloroform solution used in the absorption measurements supra, the emission spectra was determined for Compound G using the Perkin-Elmer LS-5B Spectrophotometer. Compound G had an uncorrected emission maxima (Em λ Max) of 517 nm.

Example 9

The fluorescence quantum yields, i.e., Φ, of the 1,4-bis(2-benzoxazolyl)-2-(methylsulfonamido)-benzenes of Compounds F and G are determined as described in Example 6 supra. Both quantum yields were determined in toluene at room temperature, i.e., about 22° C. The fluorescence quantum yield (Φ) of each compound of this invention, is given in Table 2 along with its primary absorption maximum (ABS) in the spectral region between 330 and 420 nm; its extinction coefficient ($\epsilon$); and its fluorescence emission maximum (FLR). The substitution of the benzazolyl group at the 5 position (5-R) and the 7 position (7-R) are included for clarity.

TABLE 2

| COMPOUND | 5-R | 7-R | ABS(nm) | $\epsilon$ | FLR(nm) | Φ |
|---|---|---|---|---|---|---|
| F | H | H | 336 | 40,000 | 505 | 0.46 |
| G | CH$_3$CH$_2$ | H | 359 | 48,000 | 517 | 0.38 |

Both Compounds F and G have an extinction coefficient above 40,000 and a fluorescence quantum yield well above 0.30 and both Compounds F and G are considered to have sufficiently high solubility so that they may be effectively used as a primary fluor.

Example 10

Plastic scintillator samples were made as follows: A solution was prepared of 0.7 g of polystyrene granules and 0.4% by weight of the fluor 1,4-bis(5-t-butyl-2-benzoxazolyl)-2-hydroxybenzene (Compound E) in 7 ml of methylene chloride. After stirring the solution for one hour, examination of the solution with ultraviolet light indicated that all crystals of the fluor had dissolved. The solution was poured into a 10 cm Petri dish and the dish was covered by a container to produce a limited evaporation rate of the methylene chloride. After 12 hours the cover was removed and the film consisting of the polystyrene and the dissolved fluor was removed from the dish. Films made in this fashion had a thickness of 100 microns and were uniformly thick to about 10%.

Films of this type, containing 0.4% by weight of fluor, were made for each of the bis-benzoxazolylhydroxybenzenes of the previous examples, i.e., Compounds A through E. The front face fluorescent spectra of each film was measured using a Perkin Elmer Model MPF-44A Fluorescence Spectrometer with the excitation wavelength set at 265 nm. All fluorescence spectra peaked between 495 and 505 nm. The relative fluorescent intensities were measured. The film containing the unsubstituted 1,4-bis(2-benzoxazolyl)-2-hydroxybenzene (Compound A) was found to give about 20 to 30% higher fluorescence intensity than the other bis-benzoxazole fluors (Compounds B through E).

Example 11

Plastic scintillator films were made as described in Example 10 containing 1,4-bis(5-t-butyl-2-benzoxazolyl)-2-hydroxybenzene (Compound E) at concentrations of 0.1, 0.3, 0.4, 0.6, 0.8, 1.0, 1.2, 2.0, and 3.0 weight %. The front face fluorescent spectra of each film was measured as described in Example 10. Two fluorescence maxima were observed, one at 280 nm corresponding to emission from polystyrene and the other at about 500 nm corresponding to emission from the fluor Compound E. As a function of increasing fluor concentration, the fluorescence intensity of polystyrene decreased uniformly until it was essentially zero at the higher fluor concentrations, i.e., 2 to 3%. This observation demonstrates that after polystyrene absorbs the 265 nm light, energy is transferred efficiently by a nonradiative or Förster process to the solute fluor at the highest fluor concentrations. When operated in this way no light is transmitted in the plastic scintillator except for the final fluorescence from the bis-benzoxazol fluor (Compound E) at more than 480 nm. This characteristic is vital for stable operation of a plastic scintillator when it is subjected to radiation of $10^4$ to $10^5$ Gy/yr.

As a function of increasing fluor concentration, the fluorescence intensity of the bis-benzoxazole fluor (Compound E) increases regularly until at 2% it saturates and remains substantially constant. This observation demonstrates that the 265 nm excitation light has been efficiently transferred to the bis-benzoxazole fluor at the higher concentrations. Such a characteristic is required for a high light output plastic scintillator.

Example 12

A plastic scintillator sample was made by adding 4 g of polystyrene granules and 0.04 g of the fluor 1,4-bis(5-t-butyl-2-benzoxazolyl)-2-hydroxybenzene (Compound E) to a glass tube container and then putting the container in a vacuum oven maintained at 280° C. for 12 hours. After removal from the oven, the fused polymer was transparent, with no visible evidence of phase separation or solute aggregation.

The fluorescence from the 4 g solid plastic scintillator was examined in the same way as for the films in Examples 10 and 11. The fluorescence spectrum of the solid sample was found to be very similar in shape and intensity as for the comparable film. This observation demonstrates that the bis-benzoxazole fluor (Compound E) can be successfully incorporated in the polymer matrix during a typical heat processing operation without fluor degradation. This characteristic is required for the melt extrusion or pre-form drawing production process of scintillating fibers.

Example 13

A plastic scintillator sample for each of the bis-benzoxazole-hydroxybenzene fluors of the previous Examples (i.e., Compounds A through E) was made as described in Example 12 for a given fluor concentration of 0.3% by weight. Each sample was placed on the photocathode of a Hamamatsu R268 photomultiplier. A Hitachi X-ray generator, Type DOP-82N operating at 60 kev and 20 ma current, was used to excite scintillation light in the plastic sample. The light produced in the scintillator was detected by the photomultiplier whose output current was measured. The relative currents associated with each sample were approximately consistent with the relative fluorescent intensities of the fluors determined in Example 10. This observation demonstrates that relative efficiency for scintillation is proportional to the relative fluorescence efficiency of each fluor. This characteristic is a necessary condition for an efficient plastic scintillator.

Example 14

A solution was prepared from 10 ml of toluene and 0.02 g of 1,4-bis(2-benzoxazolyl)-2-hydroxybenzene (Compound A). This solution was poured into a quartz cuvette and the opacity of the fluor solution was measured with a spectrophotometer. Toluene was added to the solution until the opacity was adjusted to be 2.0. The solution was decanted into a glass vial which was then exposed to $10^5$ Gy or 10 megrads of $^{60}$Co $\gamma$ rays. The irradiation rate was 0.1 megrads per hour. The irradiated solution was poured back into the quartz cuvette and an opacity measurement was repeated. The opacity in the region of peak absorption was found to be unchanged within the 10% experimental error of the measurement. In addition the shape of the absorption spectrum in the wavelength range 380 to 420 nm was found to be the same before and after irradiation. These two types of measurement are considered to be sensitive to radiation induced degradation of a particular fluor being tested.

The test carried out in this Example demonstrates that the fluor 1,4-bis(2-benzoxazolyl)-2-hydroxybenzene (Compound A) is adequately resistant to radiation degradation to be identified as "radiation-hard" as defined supra.

What is claimed is:

1. A high efficiency, radiation hard scintillator comprising a scintillator composition comprising a matrix material which is transparent in at least a portion of the visible electromagnetic radiation spectrum and an organic, fluorescent compound dispersed in the matrix material, the organic, fluorescent compound being a 1,4-bis(2-benzazolyl)-benzene having the structure:

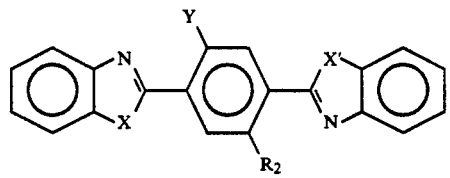

wherein X and X' each individually is a N($R_3$)— group, —O—, or —S—; Y is a proton donating group; $R_2$ is a H or a $C_1$ to $C_{10}$ alkyl group; $R_3$ is a H or a $C_1$ to $C_{10}$ alkyl group and each benzazolyl is substituted or unsubstituted wherein the organic fluorescent compound has an extinction coefficient of about 40,000 or greater in the spectral region of about 420 nm or shorter and has a fluorescence quantum yield of about 0.3 or greater in the visible spectral region of about 480 nm or longer, and wherein the fluorescence of the organic, fluorescent compound is substantially unchanged during an exposure to high energy radiation of $10^5$ Gy/yr.

2. The scintillator of claim 1 wherein the proton transfer group Y is a hydroxy group or an amido group.

3. The scintillator of claim 1 wherein X and X' each individually is —O— or —S— and the proton transfer group Y is a hydroxy group or a sulfonamido group of the structure: —NH—$SO_2$—$R_4$ wherein $R_4$ is a $C_1$ to $C_{10}$ alkyl group or aryl group.

4. The scintillator of claim 1 wherein each benzazolyl is substituted with one to four $R_1$ group(s), wherein each $R_1$ individually is a $C_1$ to $C_{10}$ alkyl group or aryl group.

5. The scintillator of claim 1 wherein X is the same as X' and R is H.

6. The scintillator of claim 1 wherein the 1,4-bis(2-benzazolyl)-benzene is selected from the group consisting of 1,4-bis(2-benzoxazolyl)-2-hydroxybenzene; 1,4-bis(benzoxazolyl)-2-(methanesulfonamido)benzene; 1,4-bis(5-ethyl-2-benzoxazolyl)-2-(methanesulfonamido)-benzene; 1,4-bis(2-benzoxazolyl)-2-(tolsylamino)-benzene; 1,4-bis(5-phenyl-2-benzoxazolyl)-2-hydroxybenzene; 1,4-bis(5-ethyl-2-benzoxazolyl)-2-hydroxybenzene; 1,4-bis(5-t-butyl-2-benzoxazolyl)-2-hydroxybenzene; 1,4-bis(5,7-dimethyl-2-benzoxazolyl)-2-hydroxybenzene; and 1,4-bis(1-methyl-2-benzimidazolyl)-2-(methanesulfonamido)benzene.

7. The scintillator of claim 1 wherein the matrix material is a solid polymeric material.

8. The scintillator of claim 7 wherein the solid polymeric material is a vinyl, a styryl, or an acrylic polymer or copolymer thereof.

9. The scintillator of claim 1 wherein the matrix material is a solvent for the organic fluorescent compound.

10. The scintillator of claim 1 wherein the organic fluorescent compound is substantially transparent to its own fluorescence emission within the visible spectral region.

11. A polymerizable composition comprising
(A) one or more polymerizable component(s) and
(B) a 1,4-bis(2-benzazolyl)-benzene compound having the structure:

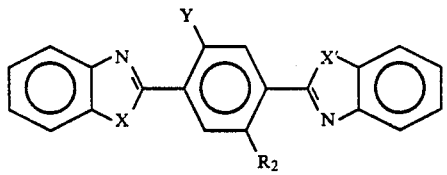

wherein X and X' each individually is a N(R₃)— group, —O—, or —S—; Y is a proton donating group; R₂ is a H or a $C_1$ to $C_{10}$ alkyl group; R₃ is a H or a $C_1$ to $C_{10}$ alkyl group and each benzazolyl is substituted or unsubstituted wherein the 1,4-bis(benzazolyl)-benzene is the sole fluorescent compound added to the composition.

12. The polymerizable composition of claim 11 wherein the polymerizable component(s) is a free radical, addition polymerizable monomer having one or more terminal, ethylenically unsaturated groups.

13. The polymerizable composition of claim 12 wherein the free radical, addition polymerizable monomer is selected from the group consisting of styrene, vinyltoluene, $C_2$ to $C_{20}$ alkyl styrene, divinylbenzene, methyl methacrylate and mixtures thereof.

14. The polymerizable composition of claim 11 wherein the 1,4-bis(2-benzazolyl)-benzene is selected from the group consisting of 1,4-bis(2-benzoxazolyl)-2-hydroxybenzene; 1,4-bis(2-benzoxazolyl)-2-(methanesulfonamido)-benzene; 1,4-bis(5-ethyl-2-benzoxazolyl)-2-(methanesulfonamido)-benzene; 1,4-bis(2-benzoxazolyl)-2-(tolsylamino)-benzene; 1,4-bis(5-phenyl-2-benzoxazolyl)-2-hydroxybenzene; 1,4-bis(5-ethyl-2-benzoxazolyl)-2-hydroxybenzene; 1,4-bis(5-t-butyl-2-benzoxazolyl)-2-hydroxybenzene; 1,4-bis(5,7-dimethyl-2-benzoxazolyl)-2-hydroxybenzene; and 1,4-bis(1-methyl-2-benzimidazolyl)-2-(methanesulfonamido)benzene.

15. A radiation hard plastic scintillator comprising:
(A) a polymeric matrix material which is transparent in at least a portion of the visible electromagnetic radiation spectrum; and
(B) one or more 1,4-bis(2-benzazolyl)-benzene compound(s) having the structure:

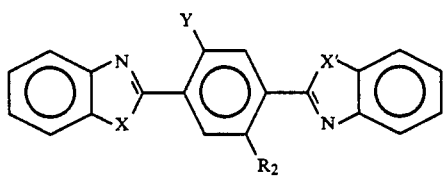

wherein X and X' each individually is a N(R₃)— group, —O—, or —S—; Y is a proton donating group; R₂ is a H or a $C_1$ to $C_{10}$ alkyl group; R₃ is a H or a $C_1$ to $C_{10}$ alkyl group and each benzazolyl is substituted or unsubstituted wherein the organic fluorescent compound has an extinction coefficient of about 40,000 or greater in the spectral region of about 420 nm or shorter and has a fluorescence quantum yield of about 0.3 or greater in the visible spectral region of about 480 nm or longer, and wherein the radiation hard plastic scintillator has a detection efficiency which changes by no more than 20% during an exposure to high energy radiation of $10^5$ Gy/yr or to 10 megarads of $^{60}Co$ γ-rays.

16. The radiation hard plastic scintillator of claim 15 wherein the 1,4-bis(2-benzazolyl)-benzene is selected from the group consisting of 1,4-bis(2-benzoxazolyl)-2-hydroxybenzene; 1,4-bis(2-benzoxazolyl)-2-(methanesulfonamido)-benzene; 1,4-bis(5-ethyl-2-benzoxazolyl)-2-(methanesulfonamido)-benzene; 1,4-bis(2-benzoxazolyl)-2-(tolsylamino)-benzene; 1,4-bis(5-phenyl-2-benzoxazolyl)-2-hydroxybenzene; 1,4-bis(5-ethyl-2-benzoxazolyl)-2-hydroxybenzene; 1,4-bis(5-t-butyl-2-benzoxazolyl)-2-hydroxybenzene; 1,4-bis(5,7-dimethyl-2-benzoxazolyl)-2-hydroxybenzene; and 1,4-bis(1-methyl-2-benzimidazolyl)-2-(methanesulfonamido)benzene.

17. The radiation hard plastic scintillator of claim 15 wherein the polymeric matrix material comprises one or more aromatic polymer(s) or copolymer(s).

18. The radiation hard plastic scintillator of claim 17 wherein the aromatic polymer is polystyrene or polyvinyltoluene.

19. The radiation hard plastic scintillator of claim 17 wherein the polymeric matrix material is a copolymer of styrene and/or vinyltoluene with a $C_2$ to $C_{20}$ alkylstyrene or divinylbenzene.

20. The radiation hard plastic scintillator of claim 15 wherein the polymeric matrix material has a glass transition temperature (Tg) of about 70° C. or lower.

21. The radiation hard plastic scintillator of claim 20 wherein the polymeric matrix material has a glass transition temperature (Tg) between about 40° C. and about 70° C.

22. The radiation hard plastic scintillator of claim 15 wherein the polymeric matrix material comprises one or more acrylic polymers or copolymers having dissolved therein an aromatic compound.

23. The radiation hard plastic scintillator of claim 22 wherein the acrylic polymer is poly(methyl methacrylate) and the aromatic compound is naphthalene.

24. A fluorescent composition comprising a matrix material which is transparent in at least a portion of the visible electromagnetic radiation spectrum and an organic, fluorescent compound dispersed in the matrix material, the organic, fluorescent compound being a 1,4-bis(2-benzazolyl)benzene having the structure:

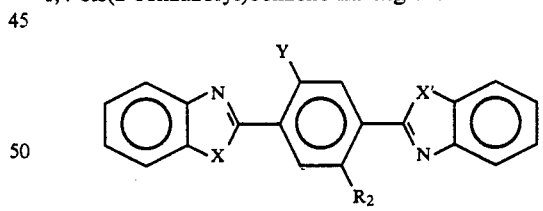

wherein X and X' each individually is a N(R₃)— group, —O—, or —S—; Y is an amido group; R₂ is a H or a $C_1$ to $C_{10}$ alkyl group; R₃ is a H or a $C_1$ to $C_{10}$ alkyl group and each benzazolyl is substituted or unsubstituted.

25. The fluorescent composition of claim 24 wherein X and X' each individually is a N(R₃)— group and the amido group Y is a sulfonamido group of the structure: —NH—SO₂—R₄ wherein R₄ is a $C_1$ to $C_{10}$ alkyl group or aryl group.

26. The fluorescent composition of claim 25 wherein R₄ is a methyl, an ethyl, a propyl, a butyl, a benzyl or a toluyl group.

* * * * *